US006565433B1

(12) United States Patent
Baerlocher et al.

(10) Patent No.: US 6,565,433 B1
(45) Date of Patent: *May 20, 2003

(54) GAMING DEVICE WITH TRAVELING REEL SYMBOLS

(75) Inventors: Anthony J. Baerlocher, Reno, NV (US); Cari L. Blomquist, Reno, NV (US); Joseph E. Kaminkow, Reno, NV (US); Lance R. Peterson, Reno, NV (US); Bayard S. Webb, Sparks, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/689,197

(22) Filed: Oct. 12, 2000

Related U.S. Application Data

(63) Continuation-in-part of application No. 09/606,928, filed on Jun. 29, 2000.

(51) Int. Cl.[7] .................................................. A63F 13/10
(52) U.S. Cl. ...................................... 463/20; 273/143 R
(58) Field of Search ................................ 463/6, 16–20; 273/138.1, 139, 143 R

(56) References Cited

U.S. PATENT DOCUMENTS 4,695,053 A 9/1987 Vazquez, Jr. et al. ... 273/143 R
5,449,173 A 9/1995 Thomas et al. ......... 273/143 R
5,664,998 A * 9/1997 Seelig et al. .................. 463/20
5,769,716 A * 6/1998 Saffari et al. ................. 463/20
5,833,536 A 11/1998 Davids et al. ................ 463/11
5,980,384 A * 11/1999 Barrie ......................... 463/16
5,997,400 A 12/1999 Seelig et al. .................. 463/6
5,997,401 A 12/1999 Crawford ...................... 463/20
6,033,307 A 3/2000 Vancura ........................ 463/20
6,056,642 A 5/2000 Bennett ........................ 463/20
6,059,289 A 5/2000 Vancura .................. 273/143 R
6,089,976 A 7/2000 Schneider et al. ............ 463/16
6,089,977 A * 7/2000 Bennett ........................ 463/20
6,120,376 A * 9/2000 Cherry ......................... 463/16
6,142,875 A 11/2000 Kodachi et al. .............. 463/20
6,270,411 B1 * 8/2001 Gura et al. ................... 463/20
6,290,600 B1 * 9/2001 Glasson ....................... 463/20

FOREIGN PATENT DOCUMENTS

WO WO 9732285 9/1997 ........... G07F/17/34

OTHER PUBLICATIONS

Bally Gaming, Inc., Goooaal!, 2000, pp. 1–2.*
Description of Symbol Feature in Australian UFO Gaming Machine published by Barcrest, Ltd. in 1995.
Description of Animating Symbol Feature in Gaming Machine.
Description of Gaming Machine with Animating Symbols published by IGT.

* cited by examiner

*Primary Examiner*—Valencia Martin-Wallace
*Assistant Examiner*—Scott E. Jones
(74) *Attorney, Agent, or Firm*—Bell, Boyd & Lloyd LLC

(57) ABSTRACT

The present invention relates to a gaming device feature which involves one or more symbols which travel from one location to a randomly determined location on one or more reels. The travel can occur at any time during a primary game or bonus round, however it preferably occurs to accompany an outcome such as a value award. This travel feature provides players with engaging entertainment and increases player enjoyment.

48 Claims, 14 Drawing Sheets

GAMING DEVICE WITH TRAVELING REEL SYMBOLS

This application is a continuation-in-part patent application of U.S. patent application, Ser. No. 09/606,928, filed on Jun. 29, 2000, entitled "Gaming Device With Traveling Reel Symbols".

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which displays traveling symbols on its reels.

BACKGROUND OF THE INVENTION

The games in many existing gaming machines, such as traditional slot machines, are based upon the concept of spinning reels. The player initiates the spin of the reels, and where the reels stop determines whether a player wins a value and, if so, how much value the player wins. These gaming machines typically have certain features designated for outcomes such as when a player wins a value, advances to a bonus round or when the game terminates. For example, these gaming machines often display the amount of credits earned, flash lights, make sounds or have other features designed to draw attention to the outcome and entertain the player. In an existing game when a predetermined event occurs, a wild card-type symbol replaces various reel symbols, one at a time. If any of those replacements result in a winning combination of symbols, the player wins a certain value. Patent Cooperation Treaty Patent No. WO 9732285 entitled, "Slot Machine Game with Roaming Wild Card," published on Apr. 9, 1997 and assigned on its face to Aristocrat Leisure Ind Pty Ltd discloses a feature generally of this type. However, these existing features do not display symbols as they move or travel from one position to another on the reels.

To increase player enjoyment and excitement, it is desirable to provide players with new features for gaming devices which use reels, where the new features involve symbols which travel on the reels.

SUMMARY OF THE INVENTION

The present invention overcomes the above shortcomings by providing a gaming device and method which includes a plurality of reels, preferably video reels and a plurality of symbols on the reels. The reels are preferably adjacent to one another. Functionally, a plurality of the reels spin, come to a stop and display one or more symbols. One or more reels may not spin and may function solely as a display screen. The term display, as used herein, includes but is not limited to showing, performing or otherwise representing a person, place or thing, at rest or in motion, visually and/or audibly.

The symbols which are displayed on each reel in relation to each other form a combination of symbols. When a player causes or reaches certain events, symbols or combinations of symbols (hereafter referred to as "triggering events") in a primary game or bonus round, the computer of the gaming device provides certain outcomes, such as providing the player with value or bonus value, providing the player with the opportunity to gain values or bonus values, deducting values or bonus values from the player, terminating the primary game or bonus round, otherwise generating an event or determining the outcome of the primary game or bonus round.

As a result of one or more triggering events at any time during a primary game or bonus round, but preferably immediately before or after any of these outcomes occurs, one or more symbols (hereinafter referred to as a "traveling symbol") travels from one location on a reel to another location on the same reel or a different reel. It should be appreciated that the present invention can be adapted to enable the player to control which traveling symbol will travel and where it will travel. It should also be appreciated that, as a result of one or more triggering events, a traveling symbol can travel from one location on a reel to one or more destination symbols which are located on the same reel or a different reel. Furthermore, the gaming device can be adapted to randomly position such destination symbols on one or more reels during a primary game or bonus round.

Preferably, the computer animates the traveling symbols when they travel. The term animate, as used herein, includes but is not limited to, moving in any direction, simulating actual movement, operation or behavior, bending, transforming into a different shape or size, separating into different parts, expanding or contracting, changing colors, shades or patterns, illuminating, making sounds or otherwise having dynamic characteristics.

It is also preferable that immediately before the traveling symbol begins to travel, during the travel or when the traveling symbol reaches its destination, the computer may display or perform certain exhibitions involving: the traveling symbol, any of the other symbols, reels or any other persons, places or things which are graphically displayed on the reels. The term exhibition, as used in this specification, includes but is not limited to any audio, visual or audiovisual representation of a person, place or thing in motion or at rest, including video images, graphics, activities, animations, virtual representations, simulations or movement.

Depending upon when the travel feature of the present invention is used in relation to a game outcome, a variety of predetermined events may occur after the travel and any exhibitions are complete. For example, the game can provide the player with values or bonus values, deduct values or bonus values or terminate the primary game or bonus round. In any case, the travel feature of the present invention provides players with engaging and enjoyable entertainment.

In one preferred embodiment, when a certain triggering event occurs, the computer displays at least two traveling symbols at different locations on one or more reels. The traveling symbols move towards one another, accompanied by various exhibitions. This preferred embodiment can be included in a primary game and/or bonus round.

Preferably in this preferred embodiment, the symbols are vehicles moving towards one another on a collision path. Also, all symbols and graphics between the two vehicles are removed and replaced with a hand. The hand is located midway between the two vehicles. Before a collision occurs, the hand holds up a traffic stop sign, and the vehicles stop traveling. The computer then replaces the stop sign with the numeric value gained by the player.

In another embodiment, the triggering event is the player choosing at least one selectable symbol displayed on the reels. When the player chooses this selectable symbol, a predetermined symbol travels towards another predetermined symbol on the reels. When the traveling symbol reaches its destination, it interacts with the symbol it reached. This preferred embodiment can also be included in a primary game and/or bonus round.

Preferably, in this embodiment the selectable symbol is a food item located on a reel. When the player selects the food item, a predetermined character travels from its location to another symbol. The computer animates the character when it travels. Also, the computer performs an exhibition when the character reaches the destination symbol. The exhibition involves interaction between the traveling character and the symbol which it reached. In an alternative embodiment, when the player selects any symbol, except for the traveling character, the traveling character travels from its location to the food item. The computer animates the traveling character and also includes an exhibition involving this character and the food item (i.e., an exhibition of the character eating the food).

The gaming device feature of the present invention includes reels which display a variety of symbols. When one or more triggering events occurs in a game or bonus round, such as the player reaching a predetermined combination of symbols, one or more symbols travels from one location on one reel to another location on another reel. The traveling is accompanied by entertaining animations and exhibitions for the player's amusement.

It is therefore an object of the present invention to provide a gaming device with reels which includes traveling symbols.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
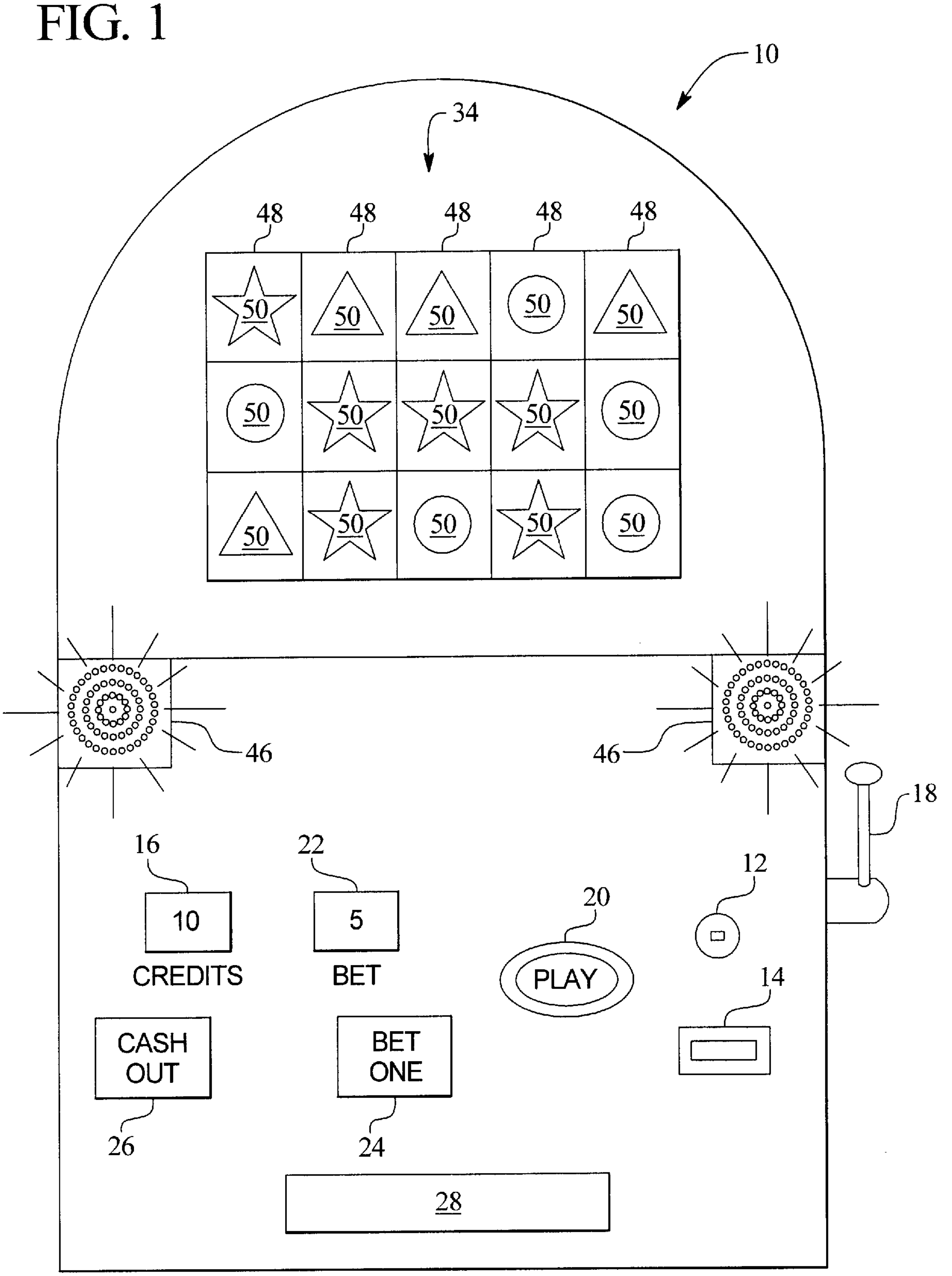
FIG. 1 is a front plan view of one embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) which a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any game such as slot, poker or keno in addition to any triggering combination. The indicia used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Figure 2:
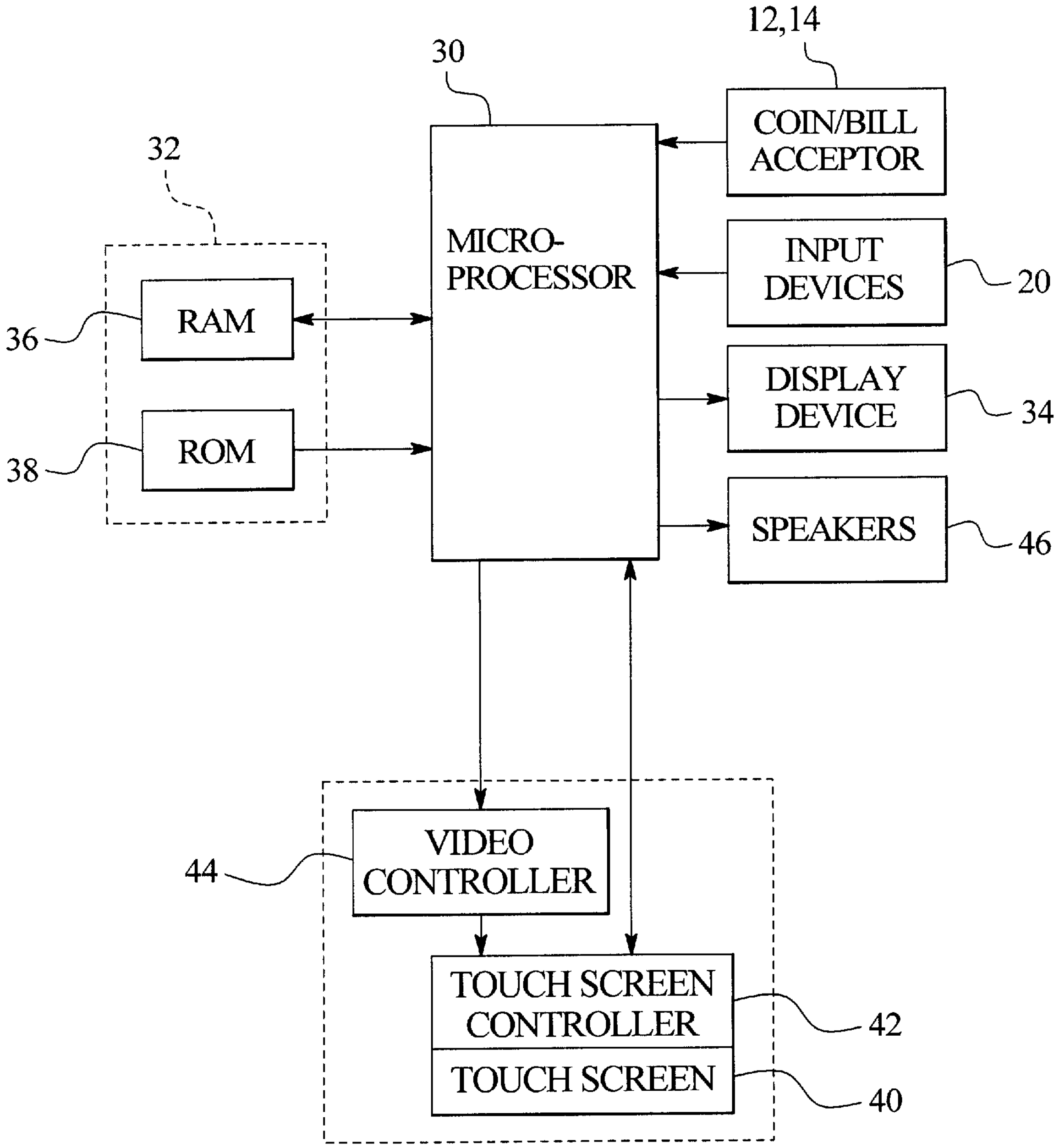
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 30, a memory device 32 for storing program code or other data, a video monitor or other display device 34 (i.e., a liquid crystal display) and at least one input device such as play buttons 20. The processor 30 is preferably a microprocessor or microcontroller-based platform which is capable of displaying and exhibiting images, symbols and other indicia such as images of people, characters, places, things and faces of cards. The memory device 32 can include random access memory (RAM) 36 for storing event data or other data generated or used during a particular game. The memory device 32 can also include read only memory (ROM) 38 for storing program code which controls the gaming device 10 so that it plays a particular game in accordance with applicable game rules and pay tables.

As illustrated in FIG. 2, the player preferably uses play buttons 20 to input signals into gaming device 10. Furthermore, it is preferable that touch screen 40 and an associated touch screen controller 42 are used instead of a conventional video display device 34. Touch screen 40 and touch screen controller 42 are connected to a video controller 44 and processor 30. A player can make decisions and input signals into the gaming device 10 by touching touch screen 40 at the appropriate places. As further illustrated in FIG. 2, the processor 30 can be connected to coin slot 12 or bill acceptor 14. The processor 30 can be programmed to require a player to deposit a certain amount of money in order to start the game. Furthermore, gaming device 10 preferably includes speakers 46 for making sounds or playing music consistent with the theme of the game and bonus scheme.

It should be appreciated that although a processor 30 and memory device 32 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 30 and memory device 32 preferably reside on each gaming device 10 unit, it is possible to provide some or all of their functions at a central location such as a network server for communication to a playing station such as over a local area network (LAN), wide area network (WAN), Internet connection, microwave link, and the like. The processor 30 and memory device 32 are generally referred to herein as the computer or the controller.

Traveling Symbol Feature

With reference to FIGS. 1 and 2, display device 34 contains a plurality of reels 48, preferably five reels in mechanical, video or virtual form. Preferably, reels 48 are in video or virtual form. Each reel 48 exhibits a plurality of symbols 50 such as letters, characters, bells, hearts, fruits, numbers, bars, things or other images which preferably correspond to a theme associated with the gaming device 10.

In primary games and in bonus rounds, when certain predetermined triggering events occur, one or more traveling symbols 52 travels from one location on a reel to another location on the same reel or another reel. A traveling symbol 52 can travel to another traveling symbol 52, any other symbol 50, any location or anything else. A traveling symbol 52 is any symbol which relocates or travels from one location on a reel 48 to another. Preferably, but not necessarily, traveling symbols 52 are representations of characters or things which have the ability to travel. If one or more of the destinations of a traveling symbol is a symbol, the gaming device can randomly position such destination symbols on one or more reels, one or more times during a primary game or bonus round. The gaming device preferably uses a predetermined mathematical formula to randomly position such destination symbols as desired by the implementer.

In operation, a player makes payment to the gaming device and the primary game begins, enabling the player to spin the reels 48. The player then uses play buttons 20 or any other activator to cause the reels 48 to spin, as indicated by block 54 in FIG. 3. The player spins the reels 48 in this manner until running out of credits or reaching a triggering event. If the player reaches certain triggering events in the primary game, a variety of outcomes may occur. One possible outcome is the computer may initiate a bonus round. Triggering events can occur in bonus rounds as well.

Figure 3:
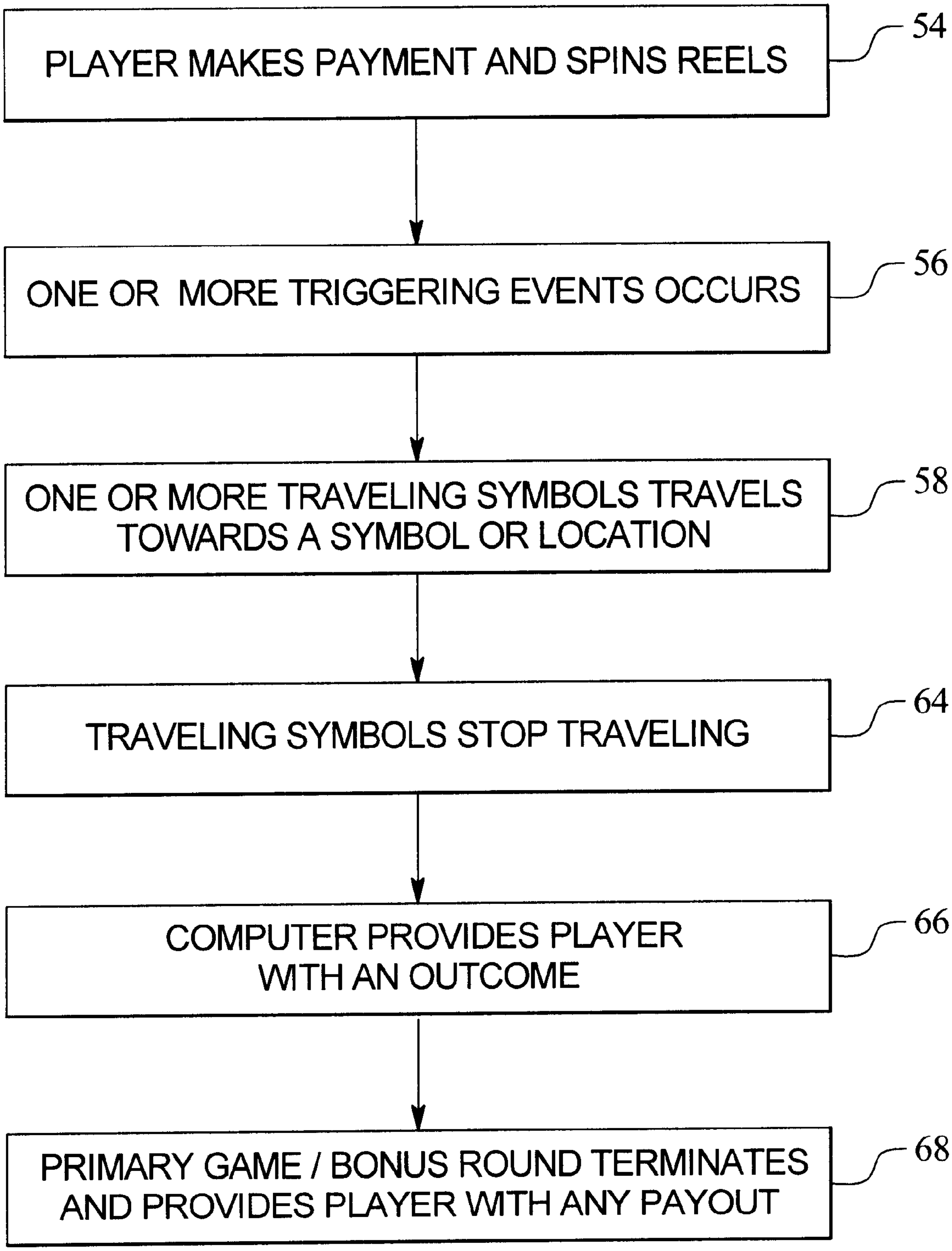
FIG. 3 is a flow diagram of one embodiment of the present invention.

Whether in a primary game or bonus round, one or more triggering events may occur, as indicated by block 56 in FIG. 3. When a player reaches one or more predetermined triggering events, such as the player achieving a winning combination of symbols 50 and/or the player making a selection of a certain symbol 50, the computer causes one or more traveling symbols 52 (shown in FIGS. 4 through 14) to travel on the reels 48. The traveling symbols 52 can travel to or towards predetermined symbols 50, traveling symbols 52 or certain locations, as indicated by block 58 in FIG. 3. These traveling symbols 52 can be symbols 50 which were displayed when the triggering event occurred, or they can be new symbols which the computer used to replace certain existing symbols 50. It should be appreciated that the present invention can be adapted to enable the player to control the traveling. For example, the computer can enable the player to choose which symbol(s) will travel, their destinations or a combination thereof. The player can make these choices by touching the touch screen 40 at the location adjacent to the symbols 50 which the player desires to move and/or the location adjacent to the desired destination.

In one embodiment when a triggering event occurs, one or more traveling symbols 52 travels to different locations on the reels 48 and to different symbols 50 in various manners and in various scenarios. Certain of these manners and scenarios are illustrated in FIGS. 4 through 8. It should be appreciated, however, that other manners of traveling and other scenarios are contemplated by the present invention.

Figure 4:
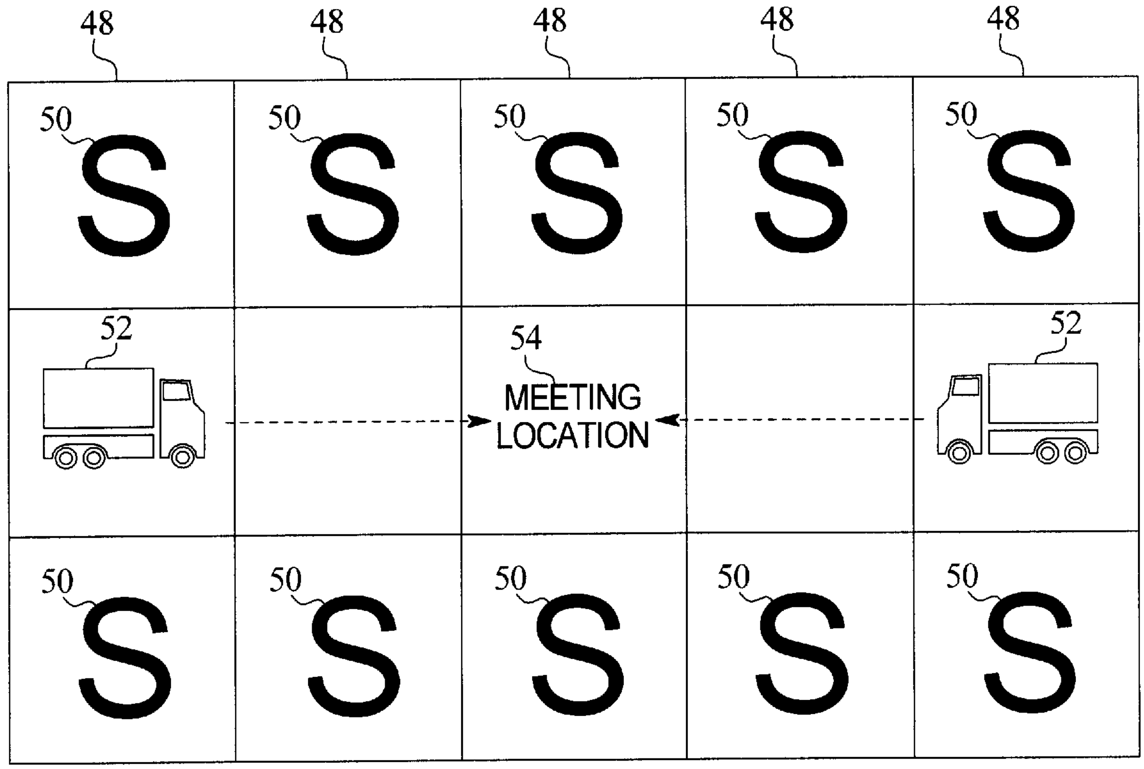
FIG. 4 is a top plan view of the reels, symbols and traveling symbols in one embodiment of the present invention.

As illustrated in FIG. 4, the computer can display two traveling symbols 52, apart from one another at certain locations on certain reels 48. Here, symbols 52 are shown as trucks. Preferably, the computer removes all symbols 50 and graphics between the two traveling symbols 52. It is also preferable that the computer displays or performs certain exhibitions (not shown) on the reels 48, preferably between the traveling symbols 52. After these exhibitions, if any, the computer causes the traveling symbols 52 to travel across reels towards one another. They can meet anywhere, but preferably the traveling symbols 52 meet at or near a meeting location 54, as illustrated in FIG. 4. A meeting location 54 can be any location positioned between two or more traveling symbols 52 which are traveling towards each other and where each symbol stops traveling when it reaches this location.

Figure 5:
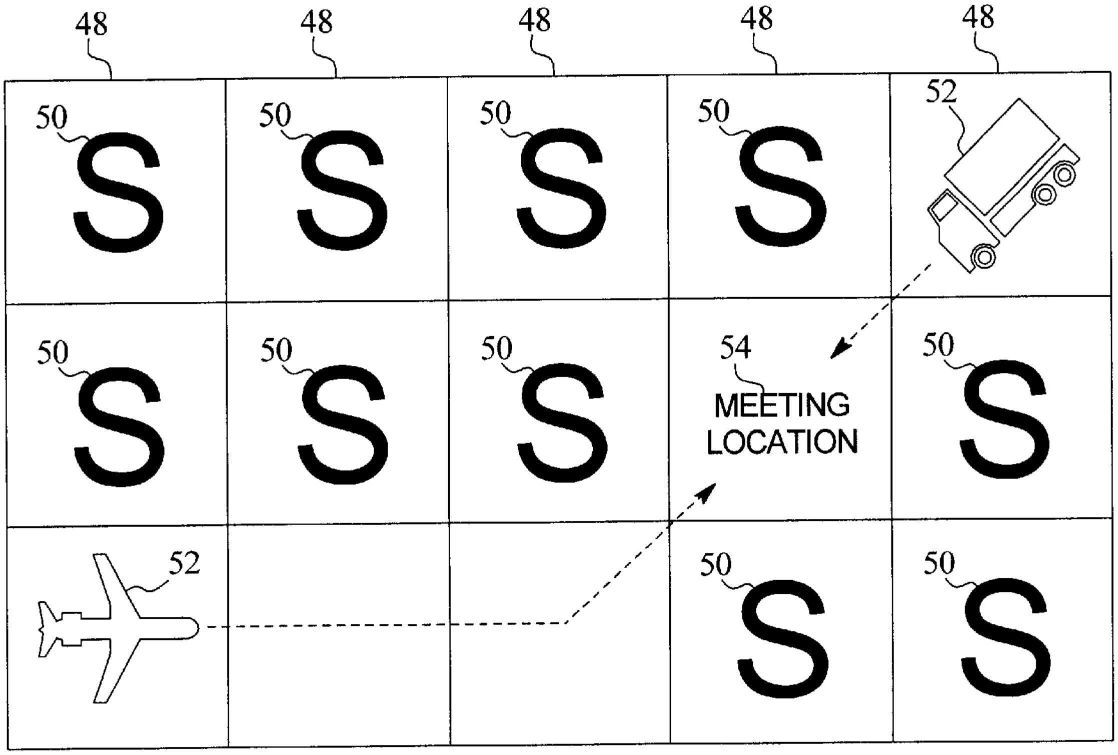
FIG. 5 is a top plan view of the reels, symbols and traveling symbols in another embodiment of the present invention.

The traveling symbols 52 can travel in any manner, such as in straight lines, curved lines or by disappearing from locations and reappearing at new locations. As illustrated in FIG. 5, two traveling symbols 52 are headed towards a predetermined meeting location 54. The traveling symbol 52 located in the far left reel 48 is illustrated as an airplane, and the traveling symbol 52 located in the far right reel 48 is illustrated as a truck. The airplane traveling symbol 52 travels past two locations formerly occupied by symbols 50 and then travels to the meeting location 54. The truck traveling symbol 52 travels directly to the meeting location 54, where it meets the airplane traveling symbol 52.

Figure 6:
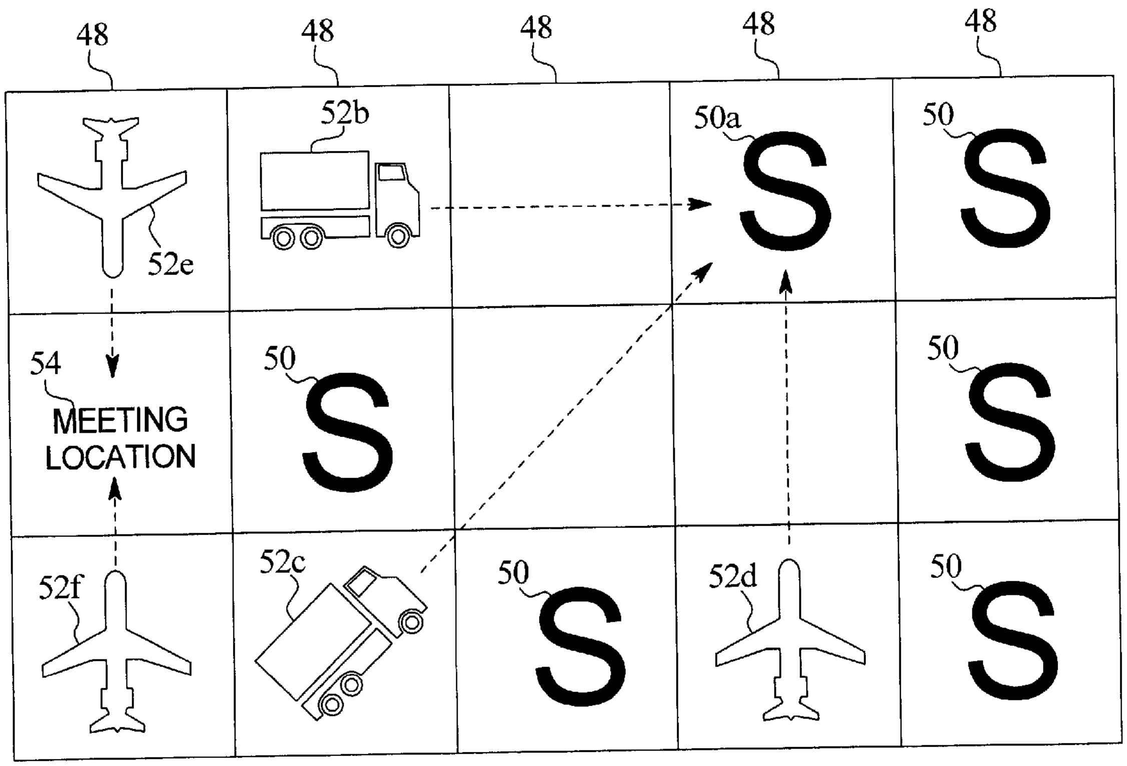
FIG. 6 is a top plan view of the reels, symbols and traveling symbols with multiple travels in one embodiment of the present invention.

Furthermore, traveling symbols 52 are not limited to traveling towards meeting locations 54 or other traveling symbols 52. Traveling symbols 52 can travel towards non-traveling symbols 50 as well. As illustrated in FIG. 6, two truck traveling symbols 52 and one airplane traveling symbol 52 travel towards a symbol 50*a*. These three symbols will stop traveling when they reach the destination symbol 50*a*.

Also as illustrated in FIG. 6, multiple travels can occur on a single set of reels 48. As just described, one travel illustrated in FIG. 6 involves two truck travel symbols 52*b* and 52*c* and one airplane travel symbol 52*d*. A different travel on the same set of reels involves two airplane travel symbols 52*e* and 52*f* traveling towards a meeting location 54. When these two symbols reach the meeting location 54, they will stop traveling.

Figure 7:
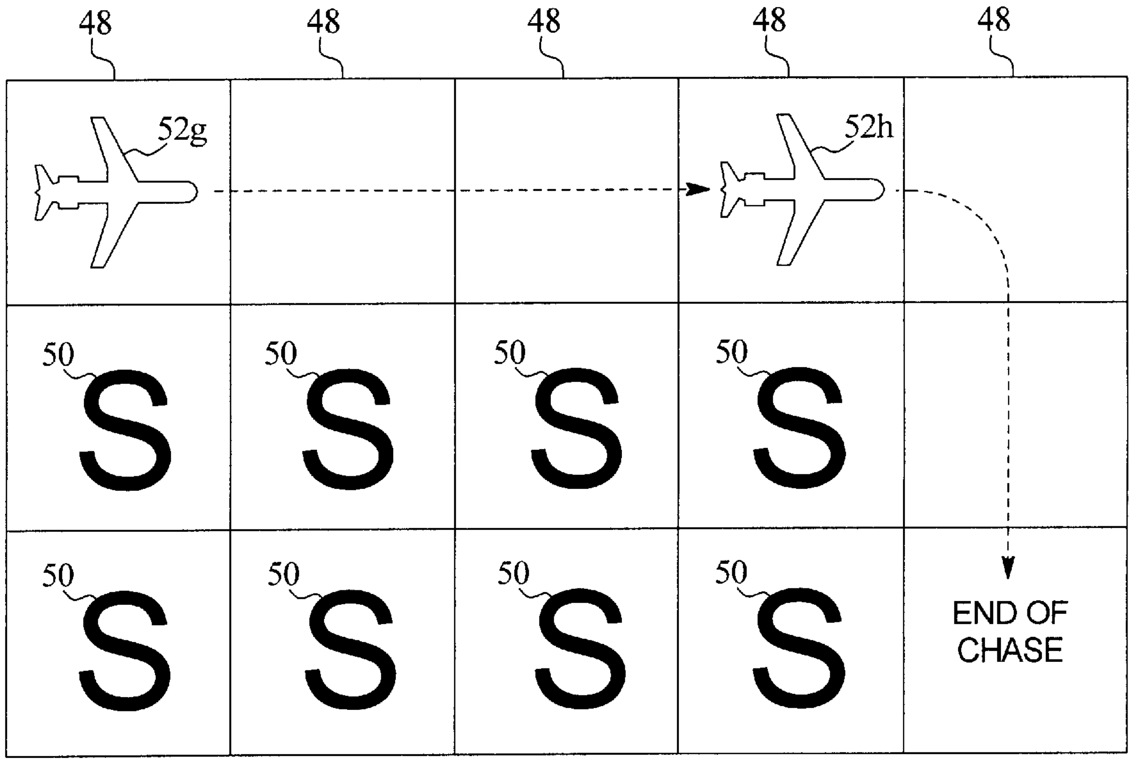
FIG. 7 is a top plan view of the reels, symbols and traveling symbols involved in a chase in one embodiment of the present invention.

In addition, one or more traveling symbols 52 can be chasing one another. As illustrated in FIG. 7, one airplane travel symbol 52*g* is pursuing or chasing another airplane travel symbol 52*h*. Preferably, the chase terminates at a predetermined location on the reels 48, as indicated with the message, “end of chase” in FIG. 7. If the chasing symbol catches the chased symbol before the chased symbol reaches this location, the traveling preferably terminates. Whether or not the chased symbol will be caught is predetermined by the computer.

Figure 8:
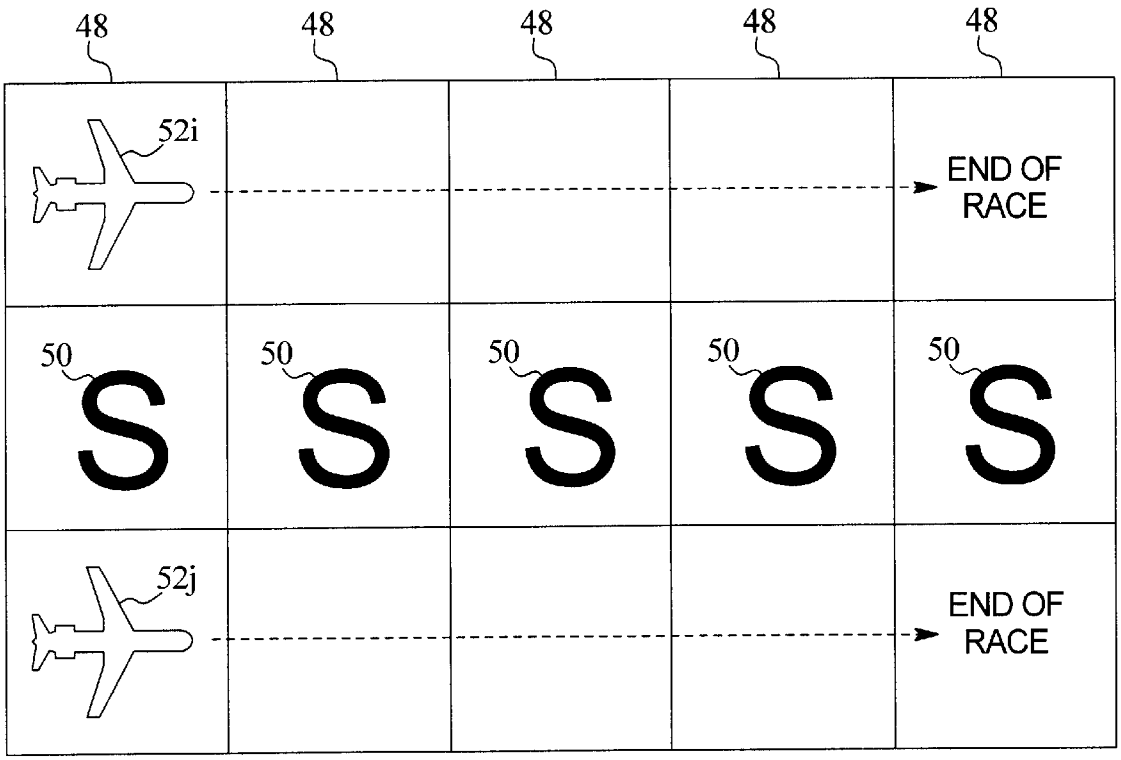
FIG. 8 is a top plan view of the reels, symbols and traveling symbols involved in a race in one embodiment of the present invention.

Two or more traveling symbols can be involved in a race. As illustrated in FIG. 8, two airplane traveling symbols 52*i* and 52*j* are racing against one another. The race begins at the far left reel 48 and preferably ends at a predetermined location, such as the far right reel 48. This predetermined end location is indicated in FIG. 8 with the message, “end of race.” The path of the race can be any shape such as linear as illustrated in FIG. 8 or cyclical. If the path is cyclical, the race can involve several laps on the reels 48.

Figure 9:
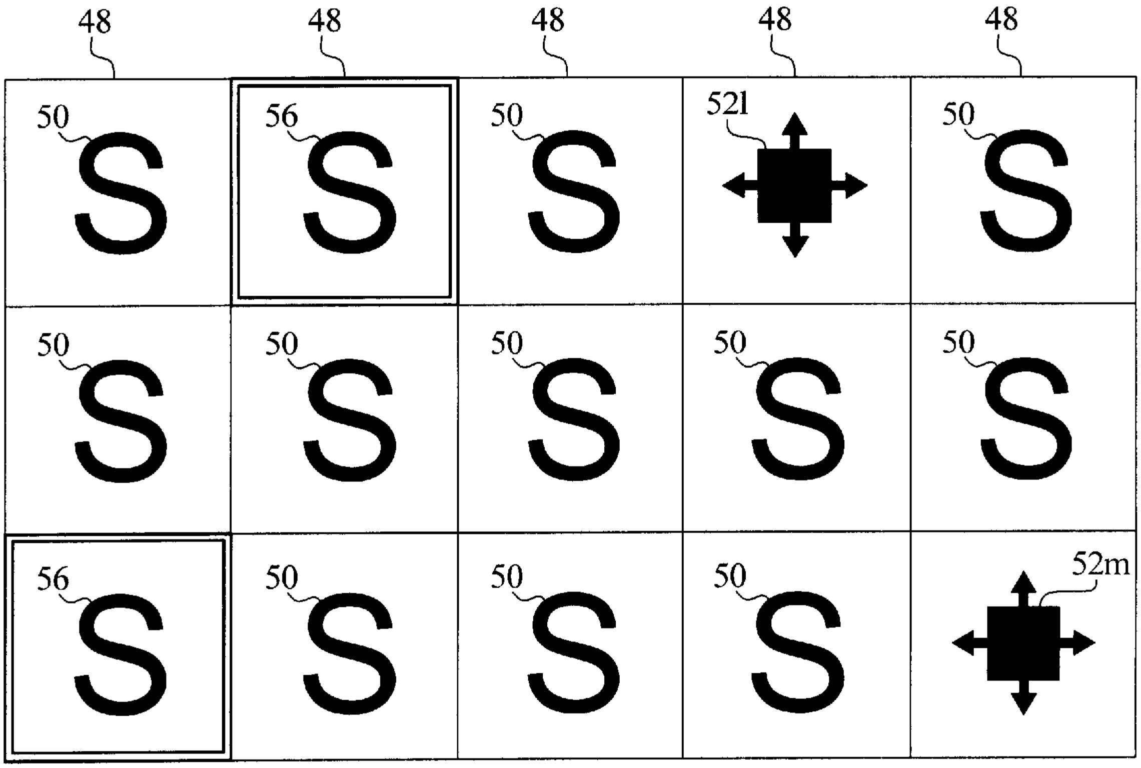
FIG. 9 is a top plan view of the reels, symbols, traveling symbols and selectable symbols in the first screen of one embodiment of the present invention.
Figure 10:
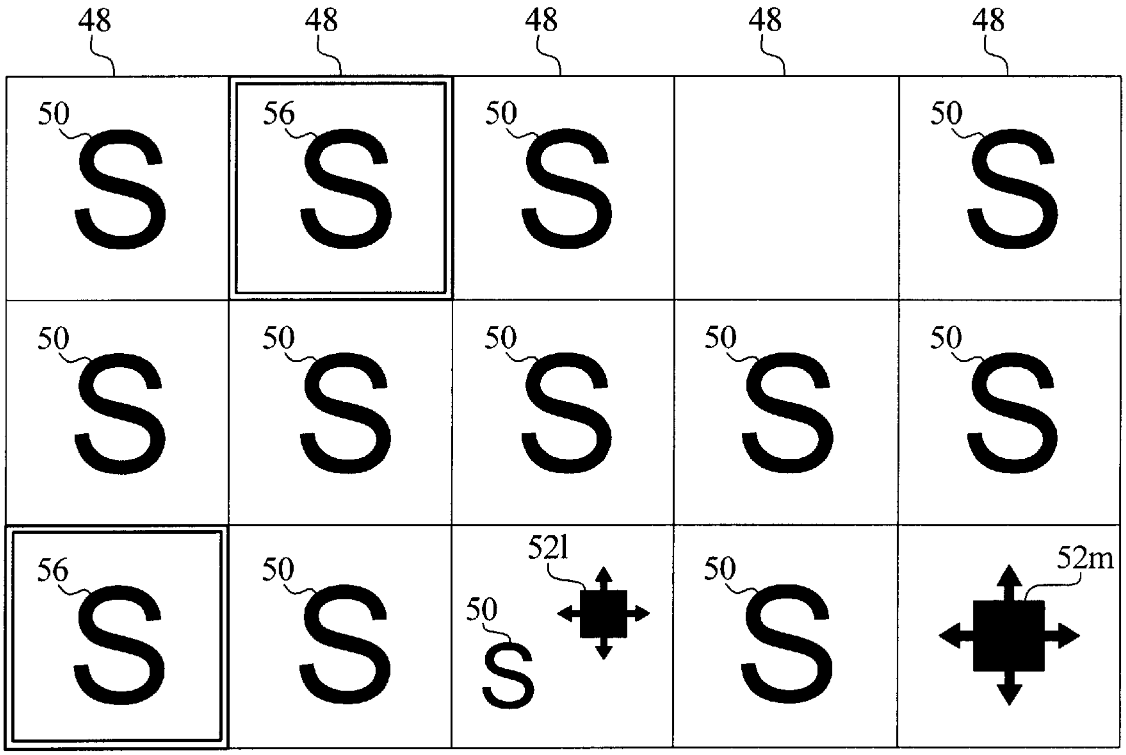
FIG. 10 is a top plan view of the reels, symbols, traveling symbols and selectable symbols in the second screen of the same embodiment of the present invention.

In another embodiment, after two triggering events occur sequentially, the traveling begins. The first event is the player reaching a winning combination of symbols 50 in the primary game. The computer initiates a bonus round. Then the computer enables the player to choose a selectable symbol 56, preferably from a plurality of selectable symbols 56, as shown in FIG. 9. The player’s selection is the second triggering event. The player makes a selection by touching touch screen 40 (shown in FIG. 2) at the area adjacent to a selectable symbol 56. The selectable symbols 56 are preferably distinguished from the other symbols 50, such as through a shaded border, as shown in FIGS. 9 and 10. Two traveling symbols 52*l* and 52*m* are also illustrated as multidirectional arrows in FIGS. 9 and 10.

When the player chooses a selectable symbol 56, at least one traveling symbol travels to a new location on the reels 48. In the example shown in FIGS. 9 and 10, a player chooses the selectable symbol 56 located in the far left reel 48. Next as illustrated in FIG. 10, the traveling symbol 52*l* located in the first reel 48 from the right, travels to the symbol 50 located in the third reel 48 from the left. Preferably, at the location of this symbol 50, the computer performs an exhibition involving interaction between this symbol 50 and the traveling symbol 52*l*.

Referring back to FIG. 3, in both of these preferred embodiments and in any scenario the traveling eventually stops, and the computer provides the player with an outcome, as indicated by blocks 64 and 66. The type of outcome depends upon the type of triggering event which occurred and the predetermined program of the computer. An example outcome in either a primary game or bonus round could be awarding the player with a value or bonus value. If the outcome is a termination, the primary game or bonus round, will of course terminate. If the outcome is not a termination, the player can continue playing until the player cashes out or runs out of credits, in which case the primary game or bonus round will terminate. After termination, the gaming device will provide the player with any credits or payout gained by the player as indicated by block 68.

In addition, it is preferable that when the traveling symbols 52 travel, the computer animates the traveling symbols 52. For example, the computer can cause a truck to appear to be moving accompanied by rotating wheels, exhaust exiting the truck and the common sound of a truck engine. Furthermore, it is preferable that the computer includes one or more exhibitions before, during or after the traveling symbols 52 complete their travel. Preferably, the exhibitions are related to a theme shared by the symbols 50, traveling symbols 52 and the overall primary game or bonus round. The computer can display or perform the exhibitions anywhere on the reels 48, and the exhibitions can involve one or more symbols 50, traveling symbols 52 or any person, place or thing graphically represented on the reels 48, and any animation or interaction involving these symbols.

Figure 11:
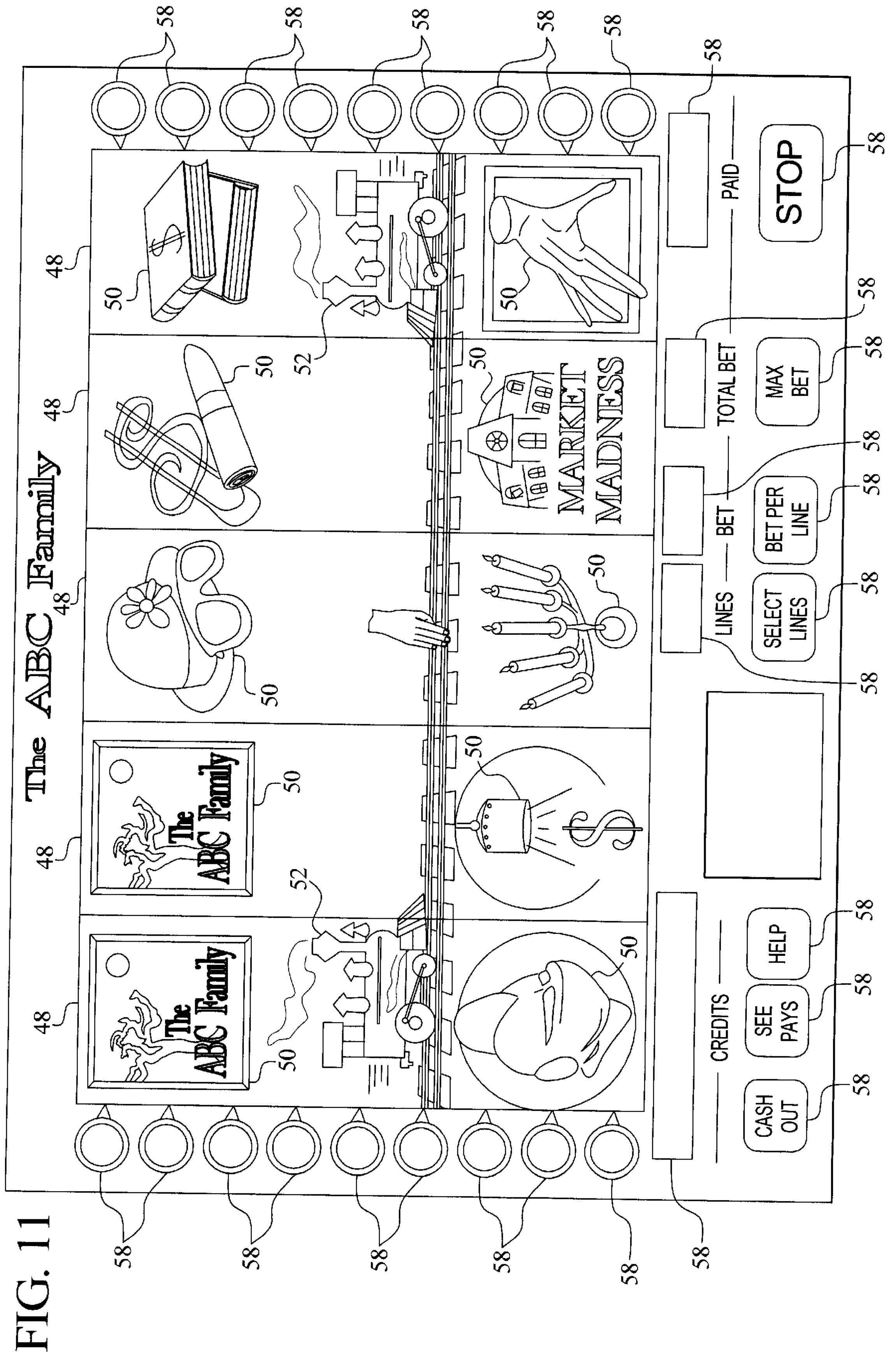
FIG. 11 is a top plan view of the reels, symbols and traveling symbols in the first screen shot of another embodiment of the present invention.
Figure 12:
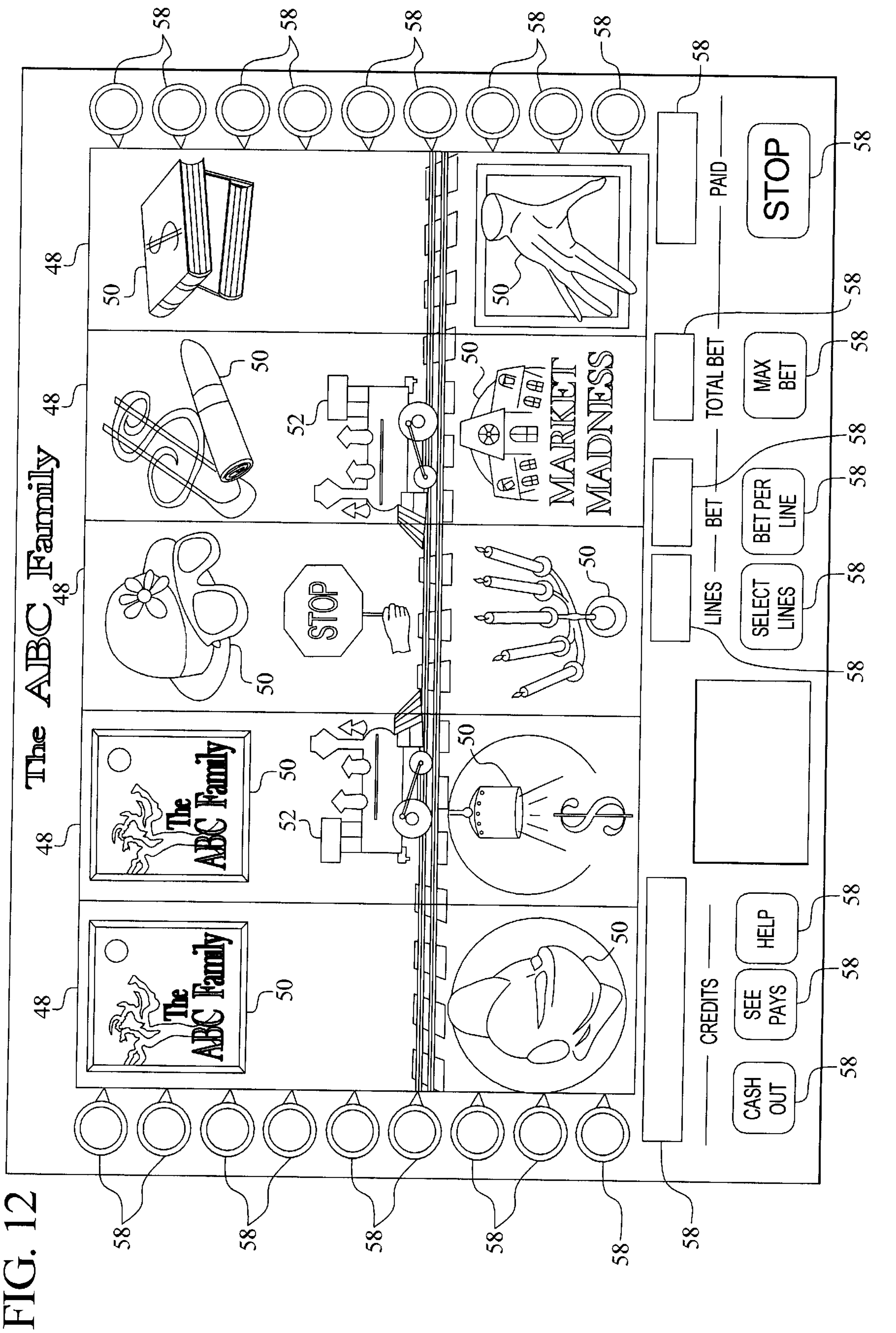
FIG. 12 is a top plan view of the reels, symbols and traveling symbols in the second screen shot of the same embodiment of the present invention.
Figure 13:
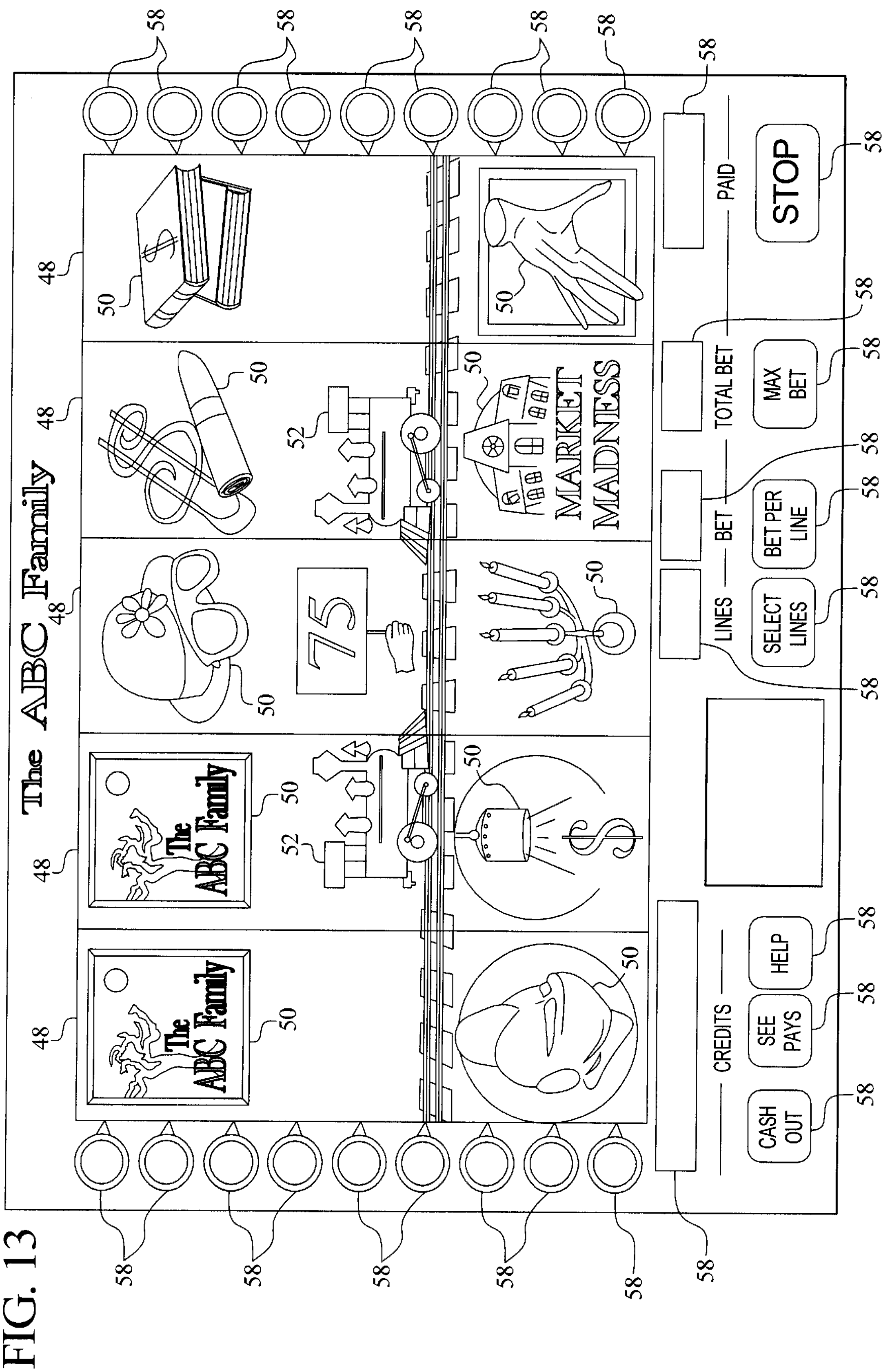
FIG. 13 is a top plan view of the reels, symbols and traveling symbols in the third screen shot of the same embodiment of the present invention.

In another preferred embodiment, shown in FIG. 11, the traveling symbols 52 are trains, preferably two trains traveling towards each other. When the triggering event occurs, in the first screen shot the computer displays the two trains at different locations on the reels 48, as shown in FIG. 11. The computer also displays exhibitions between the two trains. The exhibitions include a railroad track and a human hand. In the second screen shot shown in FIG. 12, as the trains approach each other, the human hand holds up a traffic stop sign, and the trains stop traveling when they reach the sign. Finally in the third screen shot shown in FIG. 13, the computer replaces the stop sign with a sign which bears a numeral. This numeral informs the player of the amount of value or bonus value gained by the player. As shown in FIGS. 11 through 13, this preferred embodiment of the gaming device feature of the present invention preferably incorporates the theme of The Addams Family™ television series. ADDAMS FAMILY™ is a trademark of Barbara Artists, Inc., New York, N.Y. and is used by the assignee of the present invention with permission from a licensee of this trademark, Monaco Entertainment Corporation.

Figure 14:
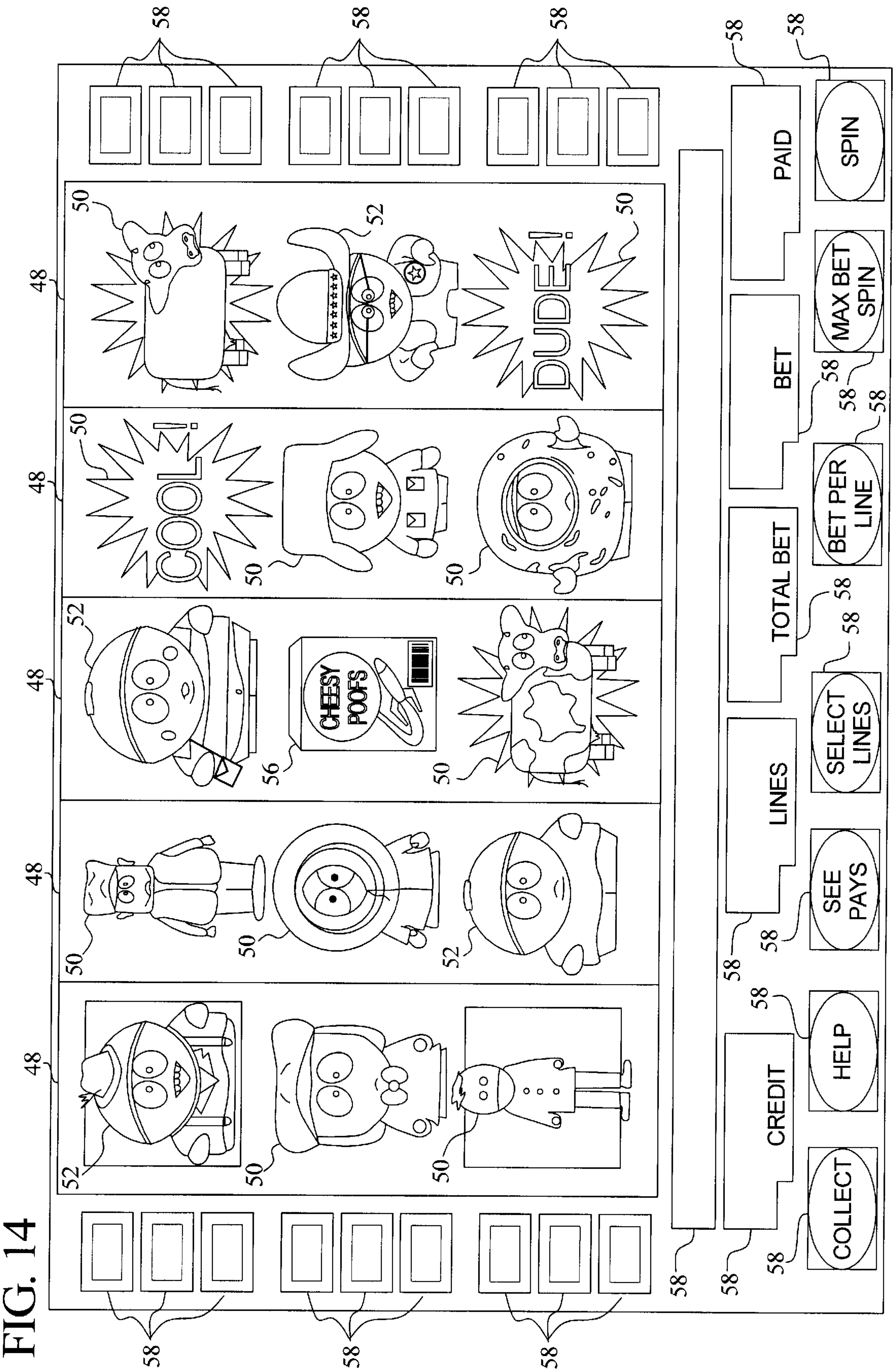
FIG. 14 is a top plan view of the reels, symbols, traveling symbols and selectable symbols in yet another embodiment of the present invention.

In yet another preferred embodiment of the present invention shown in FIG. 14, several symbols 50 are characters and others are messages. This embodiment also includes four traveling symbols 52 which are also characters, and one selectable symbol 56 which is a food item. When the player touches the area on the touch screen 40 (shown in FIG. 2) which is adjacent to the food item, one of the traveling symbol characters moves towards another character. When the traveling symbol character reaches the other character, they interact. In an alternative embodiment, when a player touches any area on the display device adjacent to any symbol 50, except for a traveling symbol 52, one of the traveling symbols 52 moves towards the food item and interacts with the food item.

As shown in FIG. 14, this preferred embodiment of the present invention preferably incorporates the South Park™ cartoon theme. SOUTH PARK™ is a trademark and service mark of Comedy Partners, New York, N.Y., and is used with permission from Comedy Partners by the assignee of the present invention.

In these two preferred embodiments involving the themes of The Addams Family™ series and South Park™ cartoon, the gaming device includes various windows 58, shown in FIGS. 11 through 14. These windows 58 allow the player to select certain game options (i.e., bet options), enable the player to operate the game and generally provide information to the player, such as the amount of value and credit the player gained.

In an alternative embodiment, a traveling symbol travels to a plurality of destination symbols which the gaming device randomly positions on a plurality of reels. In operation, a player causes the reels to spin, and when a triggering event occurs, a traveling symbol (preferably a character), travels to the destination symbols, one-by-one. At any time before the destination symbols appear on the reels, the gaming device randomly determines their positions. Shortly after a traveling symbol reaches a destination symbol, the gaming device displays a value gained by the player which is associated with such symbol. The gaming device displays the values associated with all of the destination symbols in this manner.

The gaming device feature of the present invention includes various symbols which travel from one location to another on the gaming device reels. These symbols make their travel preferably before or after an outcome occurs, such as before the player receives an award value. The traveling symbols move and interact with other reel symbols as part of an exhibition which engages and entertains the player.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A gaming device comprising:

a game including a plurality of reels;

a plurality of symbols on each of said reels, each of said symbols movable with movement of the reels during play of the game;

at least one triggering event associated with at least one of the symbols;

an award associated with the triggering event;

a graphical representation including at least one of said symbols traveling on said reels toward at least one randomly positioned destination on one of said reels;

a display device which displays the reels, the symbols and the graphical representation; and a processor in communication with the display device which causes the display device to display said graphical representation on the reels after said triggering event occurs and provides the player with the award.

2. The gaming device of claim 1, wherein the graphical representation includes a plurality of symbols traveling on said reels, and the destination is located on one of the plurality of reels between two of said symbols which travel toward the destination.

3. The gaming device of claim 1, wherein the graphical representation includes a plurality of said symbols traveling on said reels toward a plurality of randomly positioned destinations on at least one of said reels.

4. The gaming device of claim 1, wherein the graphical representation includes a plurality of the symbols traveling on said reels toward a plurality of randomly positioned destinations on a plurality of said reels.

5. The gaming device of claim 1, wherein the destination is one of said symbols.

6. The gaming device of claim 1, wherein the symbol traveling in the graphical representation is a person or character.

7. The gaming device of claim 1, wherein the symbol traveling in the graphical representation is an object.

8. The gaming device of claim 1, wherein the symbol traveling in the graphical representation moves from one of said reels onto another of said reels.

9. The gaming device of claim 1, which includes at least one image on said reels positioned between at least two of the symbols before the triggering event occurs.

10. The gaming device of claim 9, which does not include said image after the triggering event occurs.

11. The gaming device of claim 9, which includes a change to said image after the triggering event occurs.

12. The gaming device of claim 1, wherein the graphical representation includes a plurality of said symbols traveling on said reels.

13. The gaming device of claim 1, wherein the reels are virtual reels.

14. A gaming device comprising:

a slot game including a plurality of virtual reels;

a plurality of symbols on each of the virtual reels, each of said symbols movable with movement of the reels during play of the slot game;

at least one bonus triggering event associated with at least one of the symbols;

a bonus award associated with the bonus triggering event;

a graphical representation including a plurality of said symbols traveling on said reels until at least one of the reel symbols travels to a randomly determined position on at least one of the virtual reels;

at least one bonus award associated with the bonus triggering event;

a display device which displays the virtual reels, the symbols and the graphical representation; and a processor in communication with the display device which: (a) randomly generates the symbols on the virtual reels; (b) detects the bonus triggering event; (c) generates the graphical representation after detecting the bonus triggering event; and (d) provides the player with the bonus award.

15. The gaming device of claim 14, wherein the randomly determined position includes an image.

16. The gaming device of claim 14, wherein the graphical representation includes at least one image positioned between the symbols which travel toward each other.

17. The gaming device of claim 16, wherein the graphical representation includes a change in said image after a predetermined event occurs.

18. The gaming device of claim 16, wherein the graphical representation includes a removal of said image after a predetermined event occurs.

19. A gaming device comprising:

a plurality of reels;

a plurality of symbols on each of said reels, each of said symbols movable with movement of the reels;

at least one bonus triggering event associated with at least one of the symbols and a starting position associated with a position of said symbol;

a bonus award associated with the bonus triggering event;

a graphical representation including at least one of said symbols traveling from the starting position to at least one randomly determined destination on one of said reels;

a display device which displays the reels, the symbols and the graphical representation; and a processor in communication with the display device which causes the display device to display said graphical representation upon said bonus triggering event occurring and provides a player with the bonus award.

20. The gaming device of claim 19, which includes a symbol image at the starting position before the bonus triggering event occurs.

21. The gaming device of claim 20, wherein the graphical representation includes an image-less starting position after the bonus triggering event occurs.

22. The gaming device of claim 20, wherein the graphical representation includes a change in said symbol image after the bonus triggering event occurs.

23. The gaming device of claim 19, wherein the graphical representation includes displaying a removal of said entire image after the bonus triggering event occurs.

24. The gaming device of claim 19, wherein the graphical representation includes a change to at least part of said image after the bonus triggering event occurs.

25. The gaming device of claim 19, wherein the symbol travels from the starting position to a plurality of randomly determined destinations on at least one of said reels.

26. The gaming device of claim 19, wherein the reels are virtual reels.

27. A method for operating a gaming device, said method comprising the steps of:

(a) displaying a plurality of reels;

(b) displaying a plurality of symbols on said reels;

(c) spinning the reels, thereby causing the symbols to spin;

(d) detecting a triggering event associated with at least one of said symbols;

(e) randomly determining at least one destination on one of said reels;

(f) displaying at least one of the symbols traveling toward the destination to indicate the triggering event to a player; and (g) providing to the player an award associated with said triggering event.

28. The method of claim 27, wherein the step of randomly determining the destination includes the step of randomly determining at least one of the symbols as a destination.

29. The method of claim 27, which includes the step of randomly determining a plurality of different destinations on at least one of said reels.

30. The method of claim 29, which includes the step of displaying a plurality of symbols moving toward said destinations.

31. The method of claim 27, which includes the step of displaying a plurality of the symbols traveling until meeting each other at the destination.

32. The method of claim 27, which includes the step of displaying at least one symbol chasing at least one other symbol.

33. The method of claim 27, which includes the step of displaying a plurality of symbols racing against one another.

34. The method of claim 27, which includes the steps of displaying at least one image positioned between at least one symbol and the destination and making a change to said image after the triggering event is detected.

35. The method of claim 27, which includes the step of displaying a path on at least one of the reels after the bonus triggering event is detected.

36. The method of claim 35, which includes the step of graphically identifying at least one predetermined position on said path.

37. The method of claim 36, which includes the step of displaying a plurality of the symbols moving toward said position on said path.

38. A method of operating a gaming device, said method comprising the steps of:

(a) displaying a plurality of reels;

(b) displaying a plurality of symbols on said reels;

(c) spinning the reels, thereby causing the symbols to spin;

(d) detecting a bonus triggering event associated with at least one of said symbols;

(e) randomly determining at least one destination on one of said reels;

(f) enabling a player to activate at least one of the symbols by making an input;

(g) displaying at least two of the symbols traveling toward the destination to indicate the bonus triggering event to the player; and (h) providing to the player a bonus award associated with said bonus triggering event.

39. The method of claim 38, which includes the steps of enabling the player to control which of the symbols will travel toward the destination by selectively activating at least one of the symbols.

40. The method of claim 38, which includes the step of randomly determining a plurality of destinations on at least one of the reels.

41. The method of claim 40, which includes the step of enabling the player to selectively control which of the destinations at least one of the symbols will move toward.

42. A gaming device comprising:

a game including a plurality of reels;

a plurality of symbols on each of said reels, each of the symbols movable with movement of the reels during play of the game;

a graphical representation including a first one of the symbols traveling toward a second one of the symbols which is randomly positioned on one of said reels;

a display device which displays the reels, the symbols and the graphical representation;

at least one event associated with the game;

an award associated with the event; and a processor in communication with the display device which causes the display device to display the graphical representation after the event occurs and provides the player with the award.

43. The gaming device of claim 42, wherein the graphical representation includes a collision involving the first symbol and the second symbol.

44. The gaming device of claim 42, wherein the graphical representation includes a meeting of the first symbol and the second symbol.

45. A gaming device comprising:

a game including a plurality of reels;

a plurality of symbols on each of said reels, each of the symbols movable with movement of the reels during play of the game;

a graphical representation including a symbol moving away from at least one of the symbols toward a randomly determined location on one of the reels;

a display device which displays the reels, the symbols and the graphical representation;

at least one event associated with the game;

an award associated with the event; and a processor in communication with the display device which causes the display device to display the graphical representation after the event occurs and provides the player with the award.

46. The gaming device of claim 45, wherein the graphical representation includes the symbol moving toward one of the symbols.

47. The gaming device of claim 45, wherein the graphical representation includes the symbol moving toward another symbol on at least one of the reels.

48. The gaming device of claim 45, wherein the symbol includes a portion of the symbol from which the symbol is moving.

* * * * *